United States Patent
Rewilak et al.

(10) Patent No.: US 11,696,010 B2
(45) Date of Patent: Jul. 4, 2023

(54) CAMERA ASSEMBLY

(71) Applicant: Aptiv Technologies Limited, St. Michael (BB)

(72) Inventors: Krzysztof Rewilak, Dublin (IE); Kamil Klimowicz, Dublin (IE); Janusz Lipka, Dublin (IE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/930,929

(22) Filed: Sep. 9, 2022

(65) Prior Publication Data

US 2023/0070854 A1 Mar. 9, 2023

(30) Foreign Application Priority Data

Sep. 9, 2021 (GB) .................................... 2112870

(51) Int. Cl.
*H04N 23/55* (2023.01)
*H04N 23/51* (2023.01)
*H04N 25/531* (2023.01)

(52) U.S. Cl.
CPC ............ *H04N 23/55* (2023.01); *H04N 23/51* (2023.01); *H04N 25/531* (2023.01)

(58) Field of Classification Search
CPC ... H04N 5/2254; H04N 5/2252; H04N 5/3532
See application file for complete search history.

(56) References Cited

U.S. PATENT DOCUMENTS

| | | | |
|---|---|---|---|
| 2011/0225536 A1* | 9/2011 | Shams | H04N 23/55 715/773 |
| 2013/0229566 A1* | 9/2013 | Kaifu | G03B 7/02 348/360 |
| 2015/0227016 A1* | 8/2015 | Yamada | C07D 333/16 359/266 |
| 2017/0115545 A1* | 4/2017 | Yaney | G03B 11/043 |
| 2018/0120661 A1* | 5/2018 | Kilgore | H04N 23/11 |
| 2019/0346742 A1* | 11/2019 | Cammenga | H04N 23/957 |
| 2021/0291739 A1* | 9/2021 | Kasarla | H04N 23/55 |

FOREIGN PATENT DOCUMENTS

| | | |
|---|---|---|
| CN | 108989635 | 12/2018 |
| CN | 111694198 | 9/2020 |
| CN | 113130607 | 7/2021 |
| EP | 2328330 | 6/2011 |
| JP | H04323974 | 11/1992 |
| WO | 2017075459 | 5/2017 |
| WO | 2019010687 | 1/2019 |

OTHER PUBLICATIONS

"Combined Search and Examination Report", GB Application No. 2112870.7, dated Feb. 17, 2022, 14 pages.

* cited by examiner

*Primary Examiner* — Amy R Hsu
(74) *Attorney, Agent, or Firm* — Colby Nipper PLLC

(57) ABSTRACT

Disclosed are aspects of a camera assembly, including a sensor for sampling image data in a sampling step. A lens is provided for focussing light onto the sensor. A window is supported in front of the lens. The window includes a transparency changing material for varying the transmittance of light through the window in response to an input signal. The camera assembly is configured to thereby increase the transmittance of light through the window during the sampling step of the sensor.

13 Claims, 4 Drawing Sheets

CAMERA ASSEMBLY

INCORPORATION BY REFERENCE

This application claims priority to United Kingdom Patent Application Number GB2112870.7, filed Sep. 9, 2021, the disclosure of which is incorporated by reference in its entirety.

BACKGROUND

Camera monitoring systems have become common in automotive applications and are used to monitor both the interior and exterior of the vehicle. Such systems are required to operate under a variety of conditions and consequently the performance demands on automotive cameras are high. As one example, light conditions within the interior of a vehicle will vary considerably between day and night time use, in different weather conditions, and depending on whether passengers have windows or a sunroof open or interior lights on. As such, an interior RGB camera module is required to function effectively in a broad range of lighting conditions. Consequently, interior camera modules, such as those used for monitoring the driver's awareness, require relatively large, wide aperture lenses to maximise the received light in poorer lighting conditions.

A problem arising from the above is that having a large, wide aperture lens means that a large camera window or front lens element is exposed on the interior of the vehicle. Not only does this compromise the vehicle's interior aesthetics, but it also potentially presents a distraction to the driver and other passengers. For example, driver monitoring cameras are typically located in the vehicle's rear view mirror unit. Accordingly, the camera lens will be clearly visible within the driver's field of view. This may lead some drivers to a feeling that they are being watched constantly, increasing their anxiety, and reducing their concentration on driving tasks.

Car designers will often try to mitigate the above issue by disguising the camera module within the body of other units. For example, the camera module may be seated behind a window provided in dark coloured facia of the housing of the unit in which the camera module is embedded. As such, the window forms the optical front element of the camera, thereby providing a protective function as well as disguising it by integration into the surrounding panel. Nevertheless, the requirement to maintain optical performance means that the window needs to be sufficiently large and optically transparent to avoid reducing light transmission. Consequently, whilst the camera may be less noticeable to a driver in low light conditions, the camera will remain clearly visible in brighter conditions.

There is therefore a need to address the above problems with camera assemblies.

SUMMARY

The present disclosure relates to a camera assembly. The present disclosure is particularly relevant, for example, to automotive camera assemblies and interior automotive camera modules, such as driver monitoring camera units, and to camera windows for automotive cameras.

According to a first aspect, there is provided a camera assembly, including: a sensor configured to sample image data in a sampling step; a lens configured to focus light onto the sensor; and a window supported in front of the lens configured to transmit light therethrough, and wherein the window includes a transparency changing material configured to vary the transmittance of light through the window in response to an input signal.

In embodiments, the camera assembly is configured to increase the transmittance of light through the window during the sampling step.

In embodiments, the camera assembly further includes an input for receiving the input signal coinciding with the sampling step, and wherein the window is configured to increase the transmittance of light through the window in response to application of the input signal.

In embodiments, the transparency changing material is configured to be changeable between a transparent state and an opaque state in response to the application of the input signal.

In embodiments, the window includes a plurality of controllable regions of the transparency changing material within which the transmittance of light may be varied in response to the input signal applied to a respective controllable region.

In embodiments, the plurality of controllable regions are provided as a plurality of controllable line regions.

In embodiments, the sensor is configured to operate in a rolling shutter mode in which an image is captured during a plurality of sampling steps, with each sampling step including sampling of image data for an image line of the image; and wherein each controllable line region is associated with one or more image lines, and the plurality of controllable line regions are configured to be sequentially switched to a transparent state in synchronisation with the sampling of image data from the respective associated image lines of the one or more image lines. In this way, the transmission through the window may be dynamically adjusted to target light to the active regions of the sensor through the scanning process.

In embodiments, the window includes one or more controllable regions of electrochromic material within which the transmittance of light may be varied in response to the electric field applied to the respective controllable region.

In embodiments, the sensor is configured to operate in a global shutter mode in which an image is captured during a single sampling step, and wherein the window is configured to be switched to a transparent state in synchronisation with the sampling of image data during the sampling step.

In embodiments, the camera assembly further includes: a controller configured to apply the input signal to the window to vary the transmittance of light therethrough.

In embodiments, the controller is configured to control the sensor and to apply the input signal to the window to vary the transmittance of light therethrough in synchronisation with the sampling step.

In embodiments, the camera assembly is an automotive camera assembly.

In embodiments, the transparency changing material is an electrochromic material. As such, the electrochromic material may be changeable between a transparent state and an opaque state in response to application of an applied electric field. In embodiments, the electrochromic material in the opaque state forms a diffuser pattern for reducing transmittance of light through the window.

In embodiments, the camera assembly further includes a plurality of electric field conductors configured to apply an electric field to the window.

In embodiments, the camera assembly further includes a housing configured to enclose the lens and the sensor, wherein the window is located in an outer surface of the housing, and wherein the window is configured to be switchable between a disguised condition responsive to the transparency changing material being in an opaque state and an exposed condition responsive to the transparency changing material being in a transparent state.

In embodiments, the window comprises a front element of the lens.

BRIEF DESCRIPTION OF THE DRAWINGS

Illustrative embodiments will now be described with reference to the accompanying drawings in which.

DETAILED DESCRIPTION

Figure 1A:
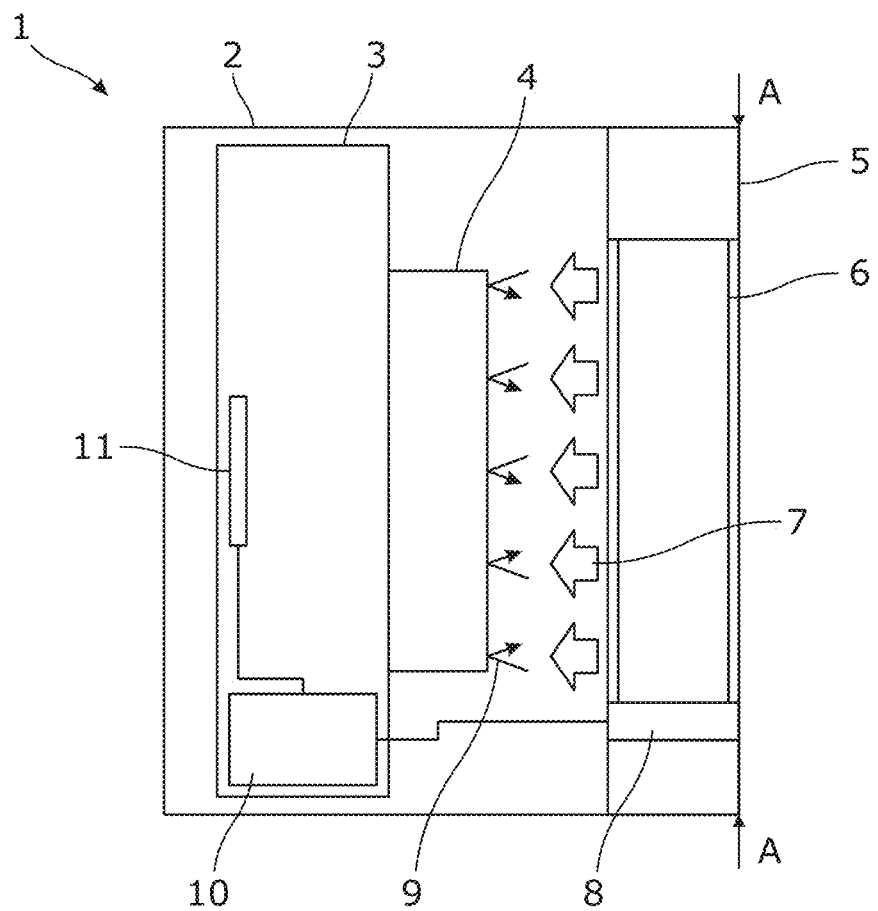
FIG. 1A is a schematic cross-sectional view of a camera assembly according to a first embodiment when in a transparent state.

An automotive camera assembly 1 according to a first embodiment is shown in FIGS. 1A to 2B. Starting initially with FIG. 1A, the assembly includes a housing 2, which may form part of a larger unit or cluster within the vehicle. For example, in the case of a driver awareness camera system, the housing 1 may be provided as part of the rear-view mirror unit mounted to an interior ceiling, in front of the driver.

A camera module 3 is secured within the housing 2 and includes a lens 4, a sensor 11, and a controller 10. The sensor 11 in this embodiment is a CMOS sensor which samples visible light focussed on its surface by the lens 4 and is used to generate image data through controller 10 for subsequent processing by the vehicle's safety systems. It will be understood that the lens 4 may include one or more optical elements for focussing the light onto the sensor 11. Furthermore, although the controller 10 has been shown separate to the sensor 11 in the Figure, it will be understood that these components may be integrated, for instance on a common printed circuit board.

Figure 1B:
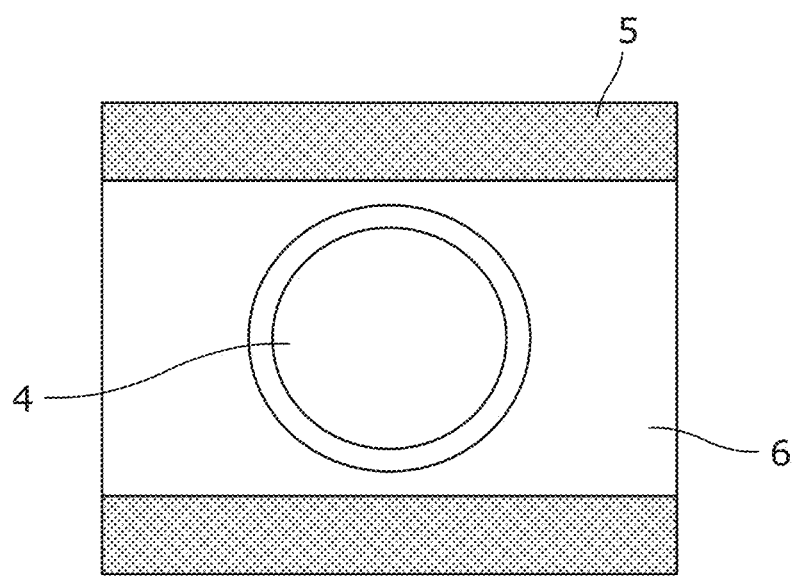
FIG. 1B is a front view of the camera assembly of the first embodiment, when in the transparent state.

As shown in FIG. 1A, the front of the housing 2 is provided with an aperture into which a window 6 is located, adjacent to the front of the camera lens 4. As such, the camera 3 faces the exterior of the housing 2 through the window 6. As shown in FIG. 1B, the window 6 is thereby exposed at the front of the camera assembly, and is bordered by the adjacent surfaces of the front face 5 of the housing 2.

The window 6 includes a transparency changing material such that the transmittance of light through the window 6 can be varied under the control of a control signal applied through input 8. In FIGS. 1A and 1B, the window is shown in its transparent state. In this embodiment, the transparency changing material is an electrochromic material, although optically or thermally driven transparency changing materials may also be used. That is, in other embodiments, an optical or thermal input signal may be used to effect a change in transparency state. The transparency changing material may be, for example, a glass, foil, or plastic having transparency change properties. The input 8 is connected to the controller 10 which synchronises the output of the control signal with sampling steps performed via the sensor 11.

In this embodiment, the window 6 is constructed of an electrochromic material applied to a substrate, together with two electric field conductors. In use, the optical properties of the window 6 can thereby be varied by applying a voltage to the electric field conductors via the input 8 for generating an electric field through the electrochromic material. This application of an electric field changes the state of the electrochromic material, resulting in the switching between a transparent state and an opaque state. In the opaque state, the transmittance of light through the window 6 is reduced. Conversely, the controller 6 may apply an inversed electric field to remove the opaque colouring by transitioning the electrochromic material to the transparent or bleached state. In this state, light is transmitted though the material at its maximum intensity. Accordingly, by switching the state of the electrochromic material, the transparency of the window 6 may be varied.

As mentioned above, FIGS. 1A and 1B respectively show side cross-sectional and front views of the camera assembly when in a transparent state. As such, incoming light 7 may enter the assembly 1 through the window 6 and enter lens 4 for subsequent sampling by the sensor 11. At the same time, a proportion of the incoming light 7 is reflected back as reflected light 9, which renders the optical head at the front of the lens 4 visible through the window 6 to passengers in the vehicle, as shown in FIG. 1*b*.

Figure 2A:
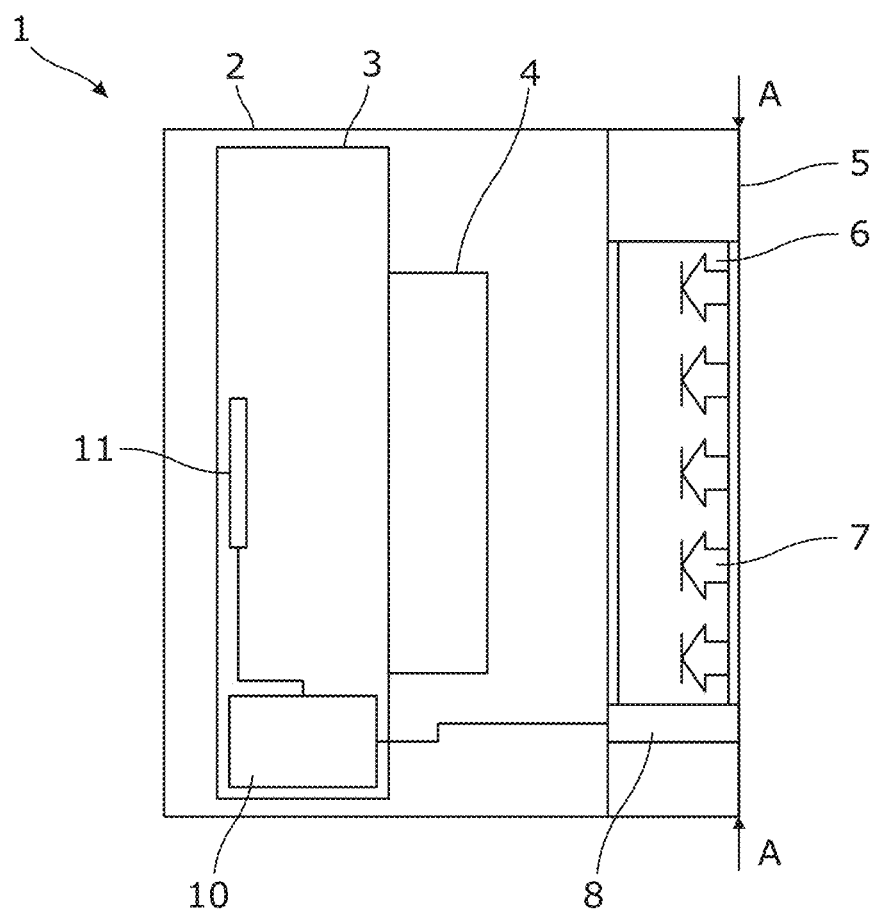
FIG. 2A is a schematic cross-sectional view of the camera assembly of the first embodiment when in an opaque state.
Figure 2B:
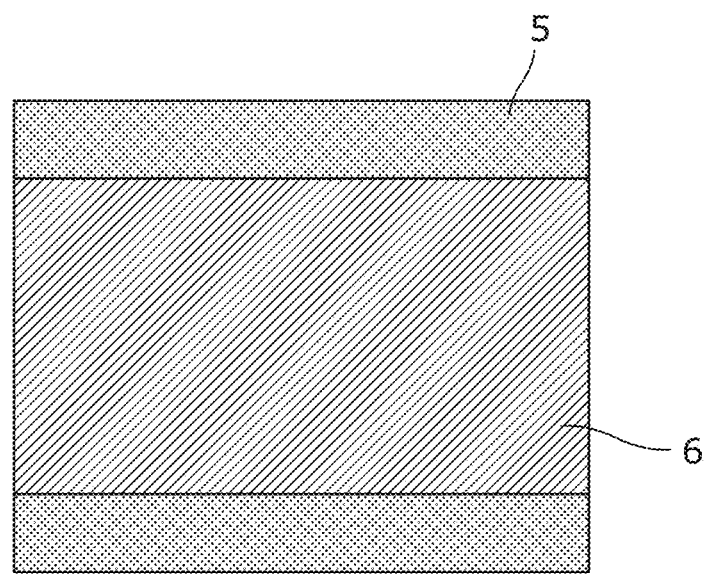
FIG. 2B is a front view of the camera assembly of the first embodiment when in the opaque state.

Conversely, FIGS. 2A and 2B respectively show side cross-sectional and front views of the camera assembly when in an opaque state. In this case, incoming light 7 is substantially absorbed by the electrochromic material within the window 6. This results in the window 6 adopting a dark coloured appearance as shown in FIG. 2B since incoming light 7 is absorbed at the window 6 and no reflected light 9 from the lens 4 is emitted. Accordingly, the window 6 is effectively blended in with the bordering front faces 5 of the housing 2. However, in the opaque state, the sensor 11 is also prevented from receiving sufficient incoming light for optimal image generation.

In use, the controller 10 controls the window 6 to be in its opaque state, as shown in FIG. 2B, by default. As such, the lens 4 is hidden from passengers in the vehicle by the window 6. In this first embodiment, the camera module 3 is operated in global shutter mode in which an image frame is generated by sampling image data across the entire sensor 11 at the same point in time, in a single step. As such, when the camera module 3 is activated, a video feed is generated by the controller 10 by successively repeating an image sampling step to expose the sensor 11 and thereby generate a sequence of video frames. At the same time, the controller 10 applies a synchronisation control signal to the input 8 to switch the window 6 to its transparent state, as shown in FIG. 1B, for the duration of each sampling step. The transparency of window 6 is thereby increased while each image is being sampled, thereby increasing if not maximising the incoming light 7 entering the lens 4, and hence improving the image quality. Once the image data has been sampled, the window 6 reverts to its opaque state under the control of the controller 10.

As the duration of each sampling step or exposure is very brief (e.g., 5-20 milliseconds), the presence of the front of the lens 4 is substantially imperceptible to passengers of the vehicle. This is because the period when the window 6 is in its transparent state for facilitating image capture is similarly brief. Consequently, to a passenger in the vehicle, the periods of switching to the transparent state are sufficiently short that the interior of the housing 2 appears obscured by the window 6. Nevertheless, for the generation of image data by the camera module 3 itself, incoming light 7 is permitted to pass through the window, and hence sensor operations of the camera module 3 are unaffected.

Embodiments may also be implemented where the camera module is operating in a rolling shutter mode in which images are sampled by recording an image frame line-by-line on the image sensor 11, rather than capturing the entire frame at once. In such an arrangement, if the entirety of the window 6 were switched to a transparent state for the duration of time where light is being sampled by the sensor 11, a flickering effect may potentially arise because the overall exposure duration is longer. To address this, a plurality of independently switchable areas may be provided in the window 6 such that the proportion of window 6 switched into a transparent state at any one time is limited to areas associated with the lines being sampled at that time.

In this connection, FIGS. 3A-4B show a second embodiment which has a camera module 3 operating in a vertical, rolling shutter mode. This embodiment is substantially the same as the embodiment described in FIG. 1A, except that the window 6 is provided with an array of horizontal switchable areas which may be independently switched between their opaque and transparent states. The control signal applied to the input 8 by the controller 10 can therefore switch lines of the window 6 to allow a strip of light through for illuminating one or more associated lines of the frame on the sensor 11.

In use, the controller 10 again controls the window 6 to be in its opaque state by default. The camera module 3, operating in a rolling shutter mode, will sample image data line by line, scanning vertically down from the top of the sensor 11. Accordingly, the image frame is generated from series of sampling steps, with each step sampling a line until image data for the entire sensor 11 has been sampled. The sequence then repeats for the next image frame.

Figure 3A:
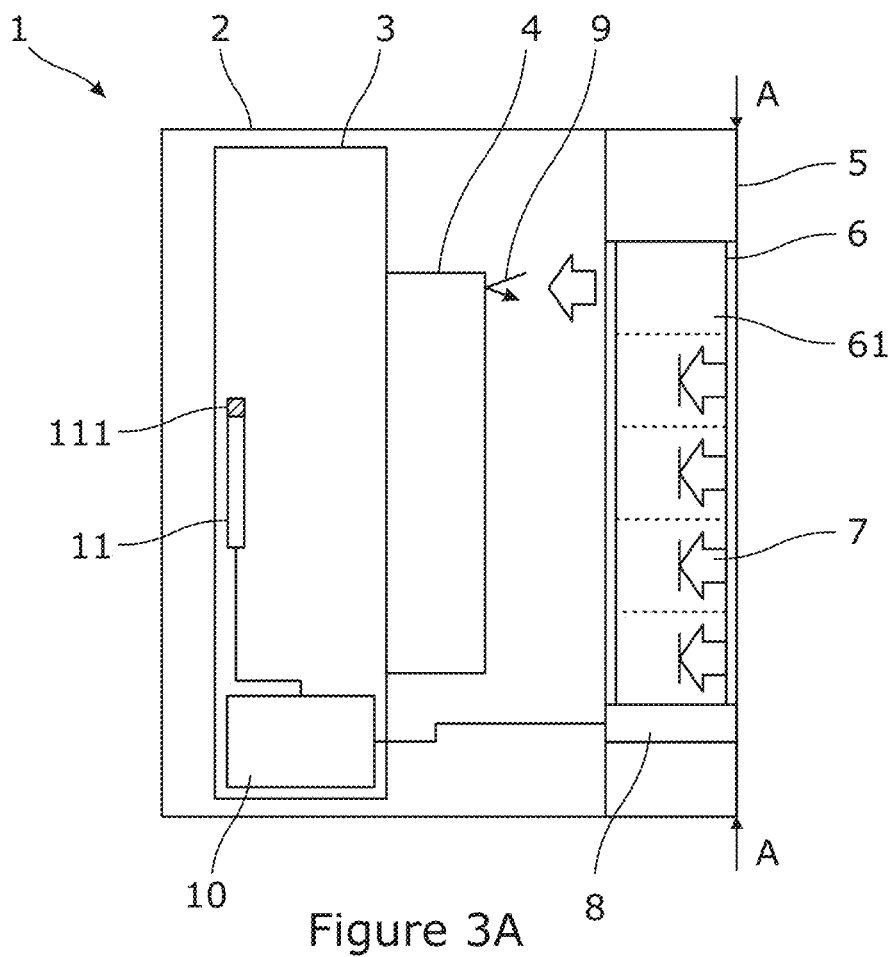
FIG. 3A is a schematic cross-sectional view of a camera assembly according to a second embodiment during a first set of sampling steps.
Figure 3B:
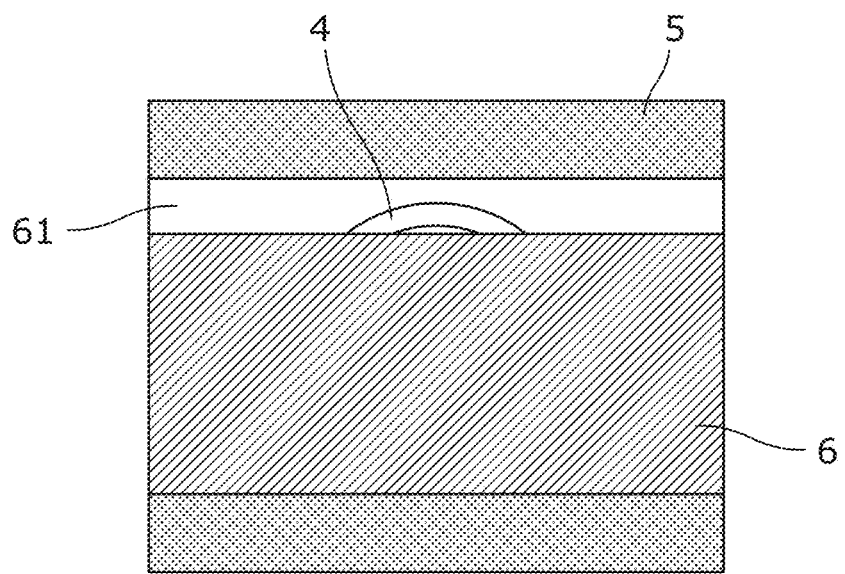
FIG. 3B is a front view of the camera assembly of the second embodiment during the first set of sampling steps.

Following the above, FIGS. 3A and 3B show the camera assembly of the second embodiment during a first set of sampling steps in which image data is sampled from a first set of lines 111 at the top of the sensor 11. At the same time, the controller 10 applies a control signal to the input 8 to switch the first switchable area 61 of the window 6 to its transparent state, as shown in FIG. 3B, for the duration of each of the first set of sampling steps. As such, the transparency of window 6 in the first region 61 is increased to apply light to the first set of lines 111 on the sensor during the sampling steps associated with that set of lines 111 of the sensor.

Figure 4A:
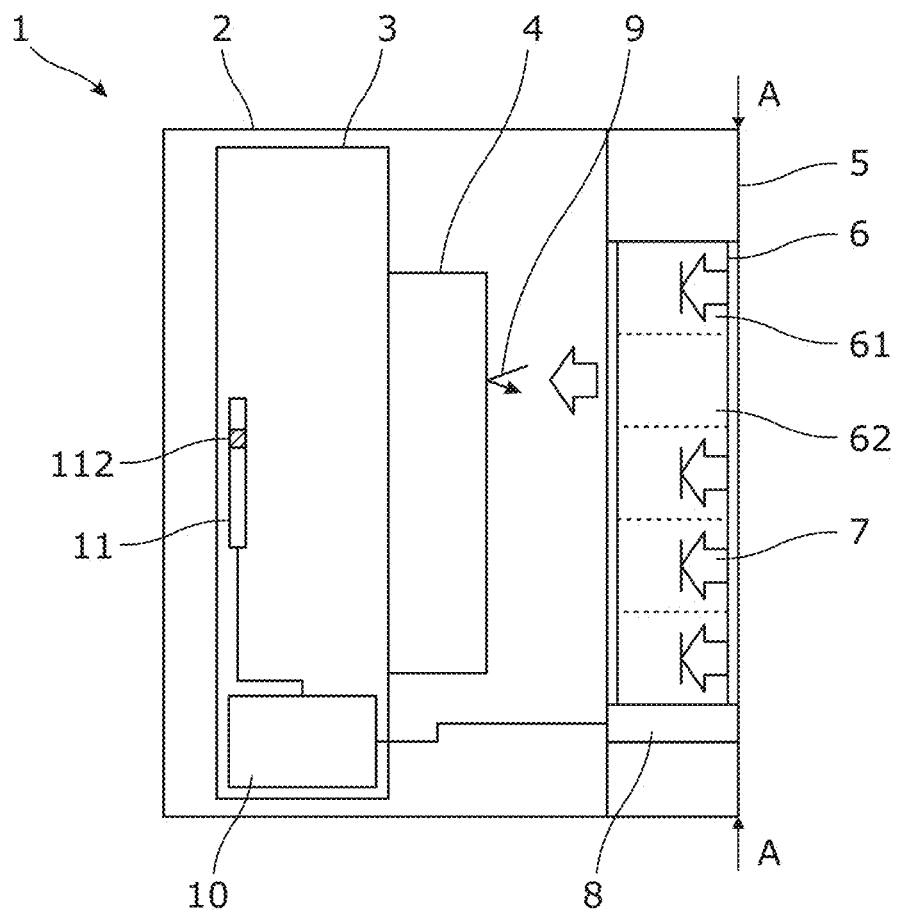
FIG. 4A is a schematic cross-sectional view of a camera assembly of the second embodiment during a second set of sampling steps.
Figure 4B:
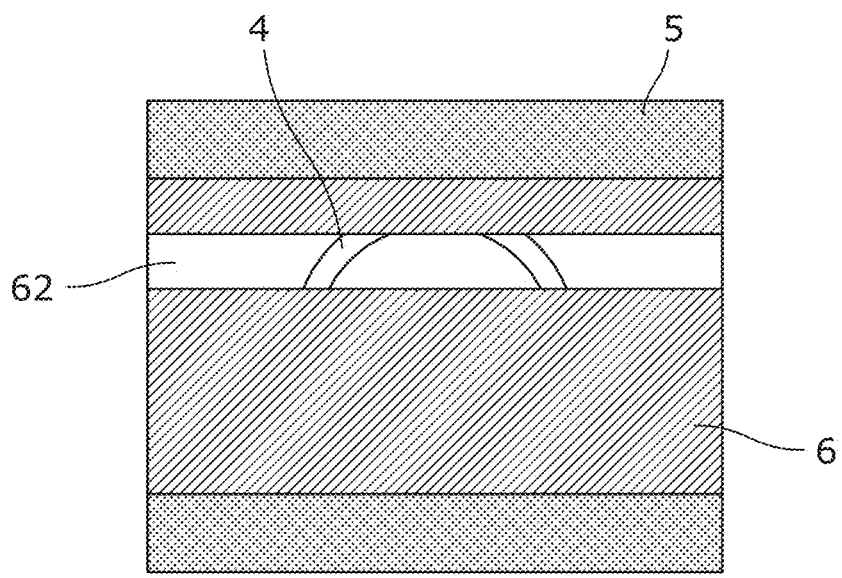
FIG. 4B is a front view of the camera assembly of the second embodiment during the second set of sampling step.

Once the sampling steps for the first set of lines 111 have been completed, the controller 10 begins sampling a second set of lines 112, as shown in FIGS. 4A and 4B. During these later sampling steps, the controller 10 applies the control signal to the input 8 to switch the second switchable area 62 of the window 6 to its transparent state, as shown in FIG. 4B, for the duration of each of the second set of sampling steps. The transparency of window 6 in the second region 62 is therefore increased to apply light to the second set of lines 112 on the sensor 11 during the sampling steps associated with that set of lines.

The above process proceeds for the remaining sets of lines of the sensor 11 and associated switchable areas of the window 6 until the entire frame has been sampled. The process then repeats for further frames.

As with the first embodiment, to a passenger in the vehicle, the interior of the housing 2 appears obscured by the window 6. That is, although the switchable regions of the window 6 are made sequentially transparent, the periods of switching are sufficiently short, and the size of the areas are sufficiently small, that their switching is imperceptible to the passengers. Accordingly, the camera module 3 may operate normally to generate a video feed, whilst being effectively hidden behind the window 6.

Embodiments therefore help to integrate the camera assembly 1 within the interior car styling, without impacting the aesthetics, compromising the user experience, or reducing the camera system performance.

It will be understood that the embodiments illustrated above show applications only for the purposes of illustration. In practice, embodiments may be applied to many different configurations, the detailed embodiments being straightforward for those skilled in the art to implement.

For example, it will be understood that although in the above embodiments the controller is described as being integrated into the camera assembly, in other embodiments it may be separate.

Furthermore, although a vertical rolling shutter operation has been described in conjunction with horizontal switchable areas of the window, it will be understood that embodiments may be applied to camera modules operating using a horizontal rolling shutter. In such embodiments, the lines of switchable areas may be provided vertically.

Moreover, although the above examples concern automotive camera systems used for sustained operations, such as driver awareness camera systems, it will be understood that embodiments may be provided for where the camera is used only intermittently. For example, a simplified embodiment may be provided where the camera may be obscured by the window when not in use, and then the window may be switched to a transparent state when the camera is activated and then maintained in that state while the camera remains active. For example, a vehicle reversing camera may be hidden behind a window and exposed when the vehicle is put into reverse. This may allow the camera unit to blend in more discretely with the rear of the vehicle.

EXAMPLE IMPLEMENTATIONS

Example 1: A camera assembly, comprising: a sensor for sampling image data in a sampling step; a lens for focussing light onto the sensor; and a window supported in front of the lens for transmitting light therethrough; wherein the window comprises a transparency changing material for varying the transmittance of light through the window in response to an input signal.

Example 2: The camera assembly according to example 1, wherein the camera assembly is configured for increasing the transmittance of light through the window during the sampling step.

Example 3: The camera assembly according to example 2, further comprising an input for receiving the input signal coinciding with the sampling step, and wherein the transmittance of light through the window is increased in response to the application of the input signal.

Example 4: The camera assembly according to any preceding example, the transparency changing material is changeable between a transparent state and an opaque state in response to the application of the input.

Example 5: The camera assembly according to any preceding example, wherein the window comprises a plurality of controllable regions of transparency changing material within which the transmittance of light may be varied in response to the input signal applied to the respective region.

Example 6: The camera assembly according to example 5, wherein the plurality of controllable regions are provided as a plurality of controllable line regions.

Example 7: The camera assembly according to any of example 6, wherein the sensor is configured for operating in a rolling shutter mode in which an image is captured during a plurality of sampling steps, with each sampling step comprising sampling image data for an image line of the image; and wherein each controllable line region is associated with one or more image lines, and the controllable line regions are sequentially switched to a transparent state in synchronisation with the sampling of image data from the respective associated lines of the image.

Example 8: The camera assembly according to any of examples 1-5, wherein the sensor is configured for operating in a global shutter mode in which an image is captured during a single sampling step, and wherein the window is switched to a transparent state in synchronisation with the sampling of image data during the sampling step.

Example 9: The camera assembly according to any preceding example, further comprising: a controller for applying the input to the window for varying the transmittance of light therethrough.

Example 10: The camera assembly according to example 9, wherein the controller controls the sensor and applies the input to the window for varying the transmittance of light therethrough in synchronisation with the sampling step.

Example 11: The camera assembly according to any preceding example, wherein the camera assembly is an automotive camera assembly.

Example 12: The camera assembly according to any preceding example, wherein the transparency changing material is an electrochromic material.

Example 13: The camera assembly according to example 11, further comprising a plurality of electric field conductors for applying an electric field to the window.

Example 14: The camera assembly according to any preceding example, further comprising a housing for enclosing the lens and sensor, wherein the window is located in an outer surface of the housing, and wherein the window is switchable between a disguised condition when the transparency changing material is in an opaque state and a exposed condition when the transparency changing material is in an transparent state.

Example 15: The camera assembly according to any preceding example, wherein the window is provided as a front element of the lens.

What is claimed is:

1. A camera assembly comprising:
   a sensor configured to sample image data in a sampling step;
   a lens configured to focus light onto the sensor; and
   a window supported in front of the lens and configured to transmit light therethrough, wherein:
   the window comprises a transparency changing material configured to vary transmittance of light through the window in response to an input signal;
   the window comprises a plurality of controllable line regions of the transparency changing material within which the transmittance of light may be varied in response to the input signal being applied to a respective controllable line region; and
   the plurality of controllable line regions is configured to be sequentially switched to a transparent state.

2. The camera assembly according to claim 1, wherein:
   the camera assembly is configured to increase the transmittance of light through the window during the sampling step.

3. The camera assembly according to claim 2, further comprising:
   an input configured to receive the input signal coinciding with the sampling step,
   wherein the window is configured to increase the transmittance of light through the window in response to application of the input signal.

4. The camera assembly according to claim 1, wherein:
   the transparency changing material is configured to be changeable between a transparent state and an opaque state in response to application of the input signal.

5. The camera assembly according to claim 1, wherein:
   the sensor is configured to operate in a rolling shutter mode in which an image is captured during a plurality of sampling steps, with each sampling step comprising sampling of image data for an image line of the image;
   each controllable line region is associated with one or more image lines of the image; and
   the plurality of controllable line regions is configured to be sequentially switched to the transparent state in synchronisation with the sampling of image data from the respective associated one or more image lines of the image.

6. The camera assembly according to claim 1, wherein:
   the sensor is configured to operate in a global shutter mode in which an image is captured during a single sampling step; and
   the window is configured to be switched to a transparent state in synchronisation with sampling of image data during the single sampling step for the global shutter mode.

7. The camera assembly according to claim 1, further comprising:
   a controller configured to apply the input signal to the window to vary the transmittance of light therethrough.

8. The camera assembly according to claim 7, wherein:
   the controller is configured to control the sensor and to apply the input signal to the window to vary the transmittance of light therethrough in synchronisation with the sampling step.

9. The camera assembly according to claim 1, wherein:
   the camera assembly comprises an automotive camera assembly.

10. The camera assembly according to claim 1, wherein:
    the transparency changing material comprises an electrochromic material.

11. The camera assembly according to claim 10, further comprising:
    a plurality of electric field conductors configured to apply an electric field to the window.

12. The camera assembly according to claim 1, further comprising:
    a housing configured to enclose the lens and the sensor, wherein:
    the window is located at an outer surface of the housing; and
    the window is configured to be switchable between a disguised condition responsive to the transparency changing material being in an opaque state and an exposed condition responsive to the transparency changing material being in a transparent state.

13. The camera assembly according to claim 1, wherein: the window comprises a front element of the lens.

\* \* \* \* \*